United States Patent [19]

Sarraf et al.

[11] Patent Number: 5,696,183
[45] Date of Patent: Dec. 9, 1997

[54] ELASTOMER-COATED MINERAL PARTICLES

[75] Inventors: Tarek Sarraf, Lons; Frédéric Hoehn; Gérard Riess, both of Mulhouse, all of France

[73] Assignee: Elf Atochem S. A., Puteaux, France

[21] Appl. No.: 324,947

[22] Filed: Oct. 18, 1994

[30] Foreign Application Priority Data

Oct. 20, 1993 [FR] France ................... 93 12490

[51] Int. Cl.$^6$ ................... C08K 9/02
[52] U.S. Cl. ................... 523/204; 523/205; 523/216; 524/492; 524/493; 524/425; 524/497; 524/437; 524/451
[58] Field of Search ................... 523/204, 200, 523/205, 216; 524/492, 493, 425, 497, 437, 451

[56] References Cited

U.S. PATENT DOCUMENTS

| | | | |
|---|---|---|---|
| 3,080,256 | 3/1963 | Bundy | 117/72 |
| 3,941,794 | 3/1976 | Malden | 260/29.2 EP |
| 3,963,512 | 6/1976 | Swift et al. | 106/308 M |
| 4,617,327 | 10/1986 | Podszun | 523/116 |
| 4,687,791 | 8/1987 | Miyajima et al. | 523/161 |

FOREIGN PATENT DOCUMENTS

| | | |
|---|---|---|
| 0 213 931 A2 | 3/1987 | European Pat. Off. . |
| 1 939 544 | 3/1971 | Germany . |

*Primary Examiner*—Paul R. Michl
*Assistant Examiner*—U. K. Rajguru
*Attorney, Agent, or Firm*—Pennie & Edmonds

[57] ABSTRACT

Disclosed are elastomer-coated mineral particles which are characterized by being in the form of individual granules. The disclosure also relates to a process for preparing the said particles, the said process being characterized in that it consists of the following: a) Causing the mineral particles to react with at least one binding agent which includes at least one polyoxyethylenic sequence, and with at least one elastomer latex; b) Separation of the liquid phase from the particles; c) Drying of the said particles. The utilization of the said particles for the reinforcement of thermoplastic polymers and thermoplastic polymers reinforced with the mineral particles according to this invention are likewise disclosed.

15 Claims, 1 Drawing Sheet

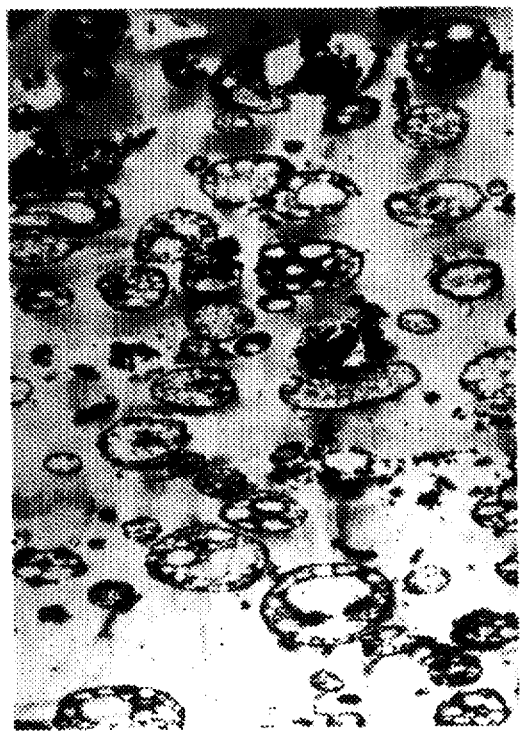
FIG. 1                FIG. 2 (COMPARATIVE)

ELASTOMER-COATED MINERAL PARTICLES

FIELD OF THE INVENTION

This invention encompasses elastomer-coated mineral particles, a process for their preparation, their use as a reinforcing material in thermoplastic polymers, and reinforced thermoplastic polymers thus produced. To mention some examples, one can use silicon or calcium carbonate particles coated with a styrene-butadiene copolymer for reinforcing polystyrene-base (PS and impact PS) or methyl polymethacrylate-base (PMMA) matrices.

BACKGROUND OF THE INVENTION

The use of mineral particles as a reinforcing agent in polymeric matrices has been known.

EP 0 249 524 describes two types of silicon-based spherical granules. The granules of the first type are of an average thickness of at least 300 Åm and a density of between 0.15 and 0.32; those of the second type have an average thickness of at least 80 μm and a density greater than 0.32. These silicon-based granules are prepared by precipitating a suspension of thin particles in the presence of a hydrophobant and an organic solvent nearly or entirely immiscible with water, the granules are then recovered and, if appropriate, washed and dried. The granules thus obtained may be subjected to a supplementary compaction process. These spherical, silicon-based granules can be used for reinforcing elastomers.

EP 0 213 931 describes large-sized lumps made up of inorganic particle aggregates and an elastomer. The process used to obtain such lumps involves the treatment of inorganic particles with a natural or synthetic latex and the addition of a water-soluble salt of a multivalent cation with a pH value below 4. The powder obtained by grinding the lumps is used for reinforcing thermoplastic and heat-cured resins.

The mineral particles according to prior art, as described, have a number of drawbacks.

The silicon-based granules are not provided with a coating that is compatible with a polymeric matrix. The result is an altogether inadequate dispersion in the said matrix and a weakening of the mechanical properties of the reinforced material.

The particles derived from grinding the lumps into powder are agglomerates of significant size and varying shapes. Their incorporation in a polymeric matrix leads to a reduction of the mechanical properties of the reinforced material.

SUMMARY OF THE INVENTION

A new class of elastomer-coated mineral particles has now been discovered that can provide effective reinforcement in thermoplastic polymers. Thus, the present invention provides compositions of matter for the reinforcement of thermoplastic polymers, which compositions of matter comprise very small mineral granules, said granules being individually coated with elastomer. The granules are coated by a process which is characterized in that it involves causing the mineral particles to react with at least one binding agent containing at least one polyoxyethylenic chain or sequence and with at least one elastomer latex; separation of the liquid phase from the particles; and drying of the said particles. This invention also relates to the utilization of the elastomer-coated particles according to this invention for the reinforcement of thermoplastic polymers.

A first objective of this invention therefore relates to elastomer-coated mineral particles in the form of single granules relatively small in size. For the purpose of this invention, the terminology "elastomer-coated mineral particles" is to be understood as single particles covered with an elastomer-base coating.

Another objective of this invention relates to a process for obtaining elastomer-coated mineral particles, said process being designed to permit effective control of the thickness of the coating.

A further objective of this invention relates to the utilization of elastomer-coated mineral particles for the reinforcement of thermoplastic polymers, such utilization permitting homogeneous incorporation of the particles in the polymer.

Another objective of this invention relates to thermoplastic polymers reinforced with mineral particles according to this invention, said reinforced polymers providing improved impact resistance.

The invention is thus based upon the new class of elastomer-coated mineral particles which are characterized in that they are in the form of individual granules. More specifically, the invention relates to such particles whose average diameter is between 0.2 and 20 μm and whose elastomer-based coating has a thickness of between 50 and 300 nm.

BRIEF DESCRIPTION OF THE DRAWINGS

FIG. 1 is an electron micrographic photograph of material in accordance with the present invention as produced in Example 17.

FIG. 2 is an electron micrographic photograph of material produced in Example 22 for comparison with material of the present invention.

DESCRIPTION OF THE PREFERRED EMBODIMENTS

As discussed in detail hereinbelow, the present invention contemplates compositions of matter for the reinforcement of thermoplastic polymers comprising small mineral granules. The granules are individually coated with elastomer. The composition of matter according to the invention involves granules of a mineral. The mineral may be selected from the group consisting of $SiO_2$, $CaCO_3$, $Ti_2O_3$, $Al(OH)_3$, and talc. The mineral granules preferably have an average diameter of between 0.2 and 20 μm and are individually coated with an elastomer layer of having a thickness of between 50 and 300 nanometers.

The granules are coated by a process characterized in that it involves the following:
 a) Causing the mineral particles to react with at least one binding agent containing at least one polyoxyethylenic chain or sequence and with at least one elastomer latex;
 b) Separation of the liquid phase from the particles;
 c) Drying of the said particles.

This invention also relates to the utilization of the elastomer-coated particles according to this invention, for the reinforcement of thermoplastic polymers. To that end, and according to a first implementational variation, this utilization is characterized in that the incorporation of the mineral particles takes place at the time of the polymerization. According to a second variation, this utilization is characterized in that the incorporation of the mineral particles takes place at the time of the extrusion.

This invention relates too to thermoplastic polymers reinforced by mineral particles according to this invention. More specifically, the invention relates to polystyrene (PS) and to the essentially PS-based compounds such as high-impact PS as well as methyl polymethylacrylate (PMMA) and the essentially PMMA-based compounds.

Other features and advantages of the present invention will become evident from the following description and non-limiting implementational examples.

The elastomer-coated mineral particles according to this invention generally have a base of $SiO_2$, $CaCO_3$, $Ti_2O_3$, $Al(OH)_3$ and talc, the preferred base being $SiO_2$ and $CaCO_3$.

These particles are generally in individual form, largely spherical and of an average diameter generally varying between 0.2 and 20 µm, preferably between 0.5 and 10 µm.

These particles are generally covered with an elastomer-base coating whose average thickness is between 50 and 300 nm, preferably between 100 and 250 nm.

The mineral particles according to this invention can be prepared according to the process described as follows.

The first step of the process is to cause the mineral particles to react with at least one binding agent containing at least one polyoxyethylenic sequence and with at least one elastomer latex.

The mineral particles are best chosen from among $SiO_2$, $CaCO_3$, $Ti_2O_3$, $Al(OH)_3$ and talc, preferably $SiO_2$ and $CaCO_3$. In general, the particles used are essentially spherical and of an average diameter ranging from 0.2 to 20 µm, preferably from 0.5 to 10 µm. These mineral particles generally have an electrically neutral or perhaps negatively charged surface.

The binding agent for the process according to this invention is chosen from among compounds with at least one polyoxyethylenic sequence. In general, at least one binding agent is selected from among the AB dual-sequence and ABA or BAB triple-sequence copolymers where A represents the polyoxyethylenic sequence and B a sequence selected from among polyoxypropylene, polystyrene, methyl polymethacrylate or a sequence with a vinylic and/or acrylic monomer base. When there are two B-sequences, they may be identical or different. The average molecular mass number of each polyoxyethylenic sequence is generally at least 1000, and preferably between 2000 and 8000. The average molecular mass number of the binding agent is generally at least 1500 and preferably between 2000 and 15000.

The elastomer latex is generally selected from among latex types whose elastomer provides functions including statistically derived distribution of groups of carboxylic acids and/or acid anhydrides. In general, an elastomer is selected from among the dienic monomer-based homopolymers such as polybutadiene and polyisoprene, and the dienic and styrenic or (meth)acrylic monomer-based copolymers of the formula

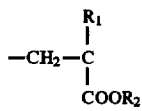

where
R₁ is a hydrogen atom or a methyl grouping
R₂ is a linear, ramified or cyclical alkyl chain containing from 1 to 12 carbon atoms.

A very suitable medium is a styrenic and butadienic (SBR) monomer-based copolymer permitting acrylic or methacrylic acid functions.

The size of the elastomer particles in the latex is generally selected in a manner that the average diameter is in the range between 50 and 300 nm, and preferably between 100 and 250 nm.

In the implementation of the first step of the process according to this invention, the quantity of the binding agent used is generally between 0.05 and 1% by weight in relation to the mineral particles, and preferably between 0.1 and 0.7%. As such, the maximum quantity of the binding agent is not critical. However, quantities greater than 1% do not make economic sense.

The amount of latex used is generally such that the ratio between the mass of the mineral particles and the mass of the dry matter contained in the latex is between 2 and 30, preferably between 5 and 15.

Combining the mineral particles, the binding agent and the elastomer latex can be accomplished in several ways.

According to one approach, an aqueous mineral-particle suspension and the binding agent are mixed in a first step; then, in a second step, the elastomer latex is added to the mixture thus obtained.

According to a second approach, the mineral particles and an aqueous binding-agent solution are mixed first; then, in a second stage, the elastomer latex is added to the mixture thus obtained.

The mixture consisting of the mineral particles, the binding agent and the elastomer latex is generally produced at ambient temperature, preferably below 30° C. (86° F.), stirring at a moderate rate, for instance by mechanical means, until individual, elastomer-coated mineral particles are obtained. In general, the time involved is deemed enough when the aqueous opalescent phase turns limpid.

In applying either method, it is desirable to control the final pH level of the mixture. When using particles of $SiO_2$, a pH level below 5 and preferably between 1.5 and 3.5 is generally maintained. In the case of CaCO3 particles, a pH below 7 and preferably between 6 and 7 is generally recommended.

The second step in the process according to this invention consists in the separation of the elastomer-coated mineral particles from the liquid phase. This separation can be performed by any known method, such as filtration, decantation or centrifugation.

The third step in the process according to this invention involves the drying of the particles produced. The drying can again be performed by conventional means, such as a drying oven or a traditional fluidized bed, preferably at a temperature below 50° C. (122° F.).

This invention also relates to the use of elastomer-coated mineral particles according to this invention for reinforcing thermoplastic polymers.

In a first implementation approach, the utilization according to this invention is characterized in that the incorporation of the elastomer-coated mineral particles takes, place at the time of radical or anionic polymerization.

In a second mode of implementation, the utilization according to this invention is characterized in that the incorporation of the elastomer-coated mineral particles takes place at the time of extrusion.

The radical or anionic polymerization and extrusion processes are known to those skilled in the art and are not themselves the subject of this invention.

The quantity of the elastomer-coated mineral particles is variable as a function of the nature of the thermoplastic polymer to be prepared. In general, the amount used is less than 70% by weight of the polymer produced and preferably between 5 and 50%.

This invention also relates to thermoplastic polymers reinforced with mineral particles according to this invention, polymers which display improved mechanical characteristics and especially greater impact resistance.

More specifically, the invention applies to thermoplastic polymers having a styrene and butadiene (high-impact PS)

monomer base, these polymers being characterized in that the mineral particles are enclosed in the polybutadiene nodules.

EXAMPLES

The following, non-limiting examples will serve to illustrate this invention.

EXAMPLE 1

1—1-100 grams (g) of $SiO_2$ (corresponding to SIFRACO c800) are dispersed in 200 milliliters (ml) of water, followed by the addition of 0.5 g of a polyoxyethylene-polyoxypropylene (POE/POP) copolymer having a molecular mass of 8350 and of which 80% by weight are constituted of the POE sequence (reference: BAYER Symperonic F68).

After one hour of stirring (400 RPM) at 25° C. (77° F.) the mineral particles are recovered by filtration and then dried in an oven at 40° C. (104° F.).

2—The mineral particles thus prepared (2 g) are dispersed in water (50 g) and the pH is adjusted to 1.5.

This is followed by the addition to the dispersion of a latex containing a styrenic/butadienic (56:44 in mole %) monomer base copolymer and displaying acrylic acid functions (2.1 $10^{-4}$ mole/g of dry copolymer) (BASF SBR latex). This latex has a pH level equal to 3.5, a content of dry matter of 29% and an average particle diameter of 180 nm.

After an hour of stirring (750 RPM) at ambient temperature, the mixture is filtered, the mineral particles are recovered, washed in distilled water and then dried.

The amount of SBR copolymer that has attached itself to the mineral particles thus prepared is measured by the weight difference before and after a one-hour pyrolysis at 550° C. (1022° F.).

The characteristics of the mineral particles obtained are summarized in Table 1.

EXAMPLES 2 TO 4

The same conditions apply as in Example 1, with the ratio R being variable.

The characteristics of the mineral particles obtained are summarized in Table 1.

EXAMPLE 5

The same process conditions apply as in Example 1, with the particles being of $CaCO_3$ (reference: OMYA Hydrocarb) and with the pH level adjusted to 6.5.

The characteristics of the mineral particles obtained are summarized in Table 1.

EXAMPLES 6 TO 8

The same conditions apply as in Example 5, with the ratio R being variable.

The characteristics of the mineral particles obtained are summarized in Table 1.

EXAMPLES 9 TO 13

The same conditions apply as in Example 5, using 0.2 g of POE/POP copolymer.

The characteristics of the mineral particles obtained are summarized in Table 1.

TABLE 1

| EXAMPLE | $R = \frac{\text{Particles}}{\text{Latex}}$ | % SBR Attached Particles | % SBR Attached SBR Introduced | Mean Diameter (µm) | Thickness of Layer |
|---|---|---|---|---|---|
| 1 | 5 | 13 | 70 | 2.0 | 180 |
| 2 | 7 | 13 | 100 | 2.1 | 250 |
| 3 | 10 | 9 | 100 | 2.1 | 200 |
| 4 | 15 | 6.5 | 100 | 2.1 | 200 |
| 5 | 5 | 9.6 | 60 | 2.4 | 250 |
| 6 | 7 | 9.5 | 70 | 3.2 | 230 |
| 7 | 10 | 8.5 | 95 | 3.2 | 200 |
| 8 | 15 | 6.2 | 100 | 3.2 | 200 |
| 9 | 1 | 3.7 | 10 | 2.6 | 180 |
| 10 | 3 | 4.0 | 15 | 3.0 | 200 |
| 11 | 5 | 4.2 | 25 | 2.9 | 180 |
| 12 | 10 | 6 | 68 | 3.1 | 230 |
| 13 | 15 | 6 | 100 | 3.3 | 250 |

EXAMPLES 14 TO 21

M1 g of mineral particles prepared according to Example 5 is dispersed in a mixture comprised of 6 g of ethyl benzene, m2 g of styrene, m3 g=0.152 $10^{-2}$ m2 g of benzoyle peroxyde, m4 g of homopolystyrene and m5 g of polybutadiene.

The mixture, while being stirred at 50 RPM, is brought to 92° C. (197.6° F.) for 4 hours, then to 150° C. (302° F.) for 3 hours.

The characteristics of the material obtained are shown in Table 2.

FIG. 1 is an electron micrographic photograph of the material per Example 17. The scale in the photograph of FIG. 1 is 1 cm=1.67 µm.

EXAMPLES 22 AND 23 (COMPARATIVE)

The procedure follows Examples 14 and 18, respectively, with $CaCO_3$ mineral particles not coated with an elastomer.

The characteristics of the materials obtained are shown in Table 2.

FIG. 2 is an electron micrographic photograph of the material per Example 22. The scale in the photograph of FIG. 2 is 1 cm=0.83 µm.

EXAMPLES 24 TO 26

A mixture is made of m1 g of mineral particles prepared according to Example 5 and m6 g of high-impact polystyrene containing 6% by weight of polybutadiene.

The mixture is extruded at 200° C. (392° F.) in a dual-screw extruder.

The characteristics of the materials obtained are shown in Table 2.

EXAMPLE 27 (COMPARATIVE)

The procedure follows Example 25, with $CaCO_3$ mineral particles not coated with an elastomer.

The characteristics of the material obtained are shown in Table 2.

EXAMPLE 28

A mixture is made of m1 g of mineral particles prepared according to Example 5 and m6 g of methyl polymethacrylate (PMMA).

The mixture is extruded along the conditions of Examples 24 to 26.

The characteristics of the material obtained are shown in Table 2.

EXAMPLE 29 (COMPARATIVE)

The procedure follows Example 28, with $CaCO_3$ particles not coated with an elastomer.

The characteristics of the material obtained are shown in Table 2.

2. The process of claim 1 wherein the mineral particles are selected from the group consisting of $SiO_2$, $CaCO_3$, $Ti_2O_3$, $Al(OH)_3$, and talc.

3. The process as in claim 2 wherein the mineral particles have an electrically neutral or negatively charged surface.

4. The process of claim 1 wherein the binding agent is chosen from the group consisting of AB bisequenced or ABA or BA trisequenced copolymers where A represents a polyoxyethylenic sequence and B represents a polyoxypropylene, polystyrene, methyl polymethacrylate, or vinylic and/or acrylic monomer-base sequence.

5. The process of claim 4 wherein the average molecular mass number of each polyoxyethylenic sequence is at least equal to 1000.

6. The process of claim 5 wherein the average molecular mass number of the binding agent is at least equal to 1500.

7. The process of claim 5 wherein the elastomer is chosen from among the dienic monomer based homopolymers and the copolymers based on dienic and styrenic or (meth) acrylic monomers of the formula

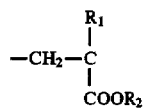

in which $R_1$ represents a hydrogen atom or a methyl grouping

TABLE 2

| EXAMPLE | m1 | m2 | m3 | m4 | m5 | M6 | Tensile Strength Breaking pt[1] (MPa) | Elongation Breaking pt[1] (%) | Tensile Elastic Modulus[1] (MPa) | Impact[2] IZOD IZOD KJ/m² |
|---|---|---|---|---|---|---|---|---|---|---|
| 14 | 10 | 90 | 0.136 | 0 | 0 | — | 36 | 3.4 | 3100 | ND |
| 15 | 5 | 95 | 0.144 | 0 | 0 | — | 34 | 3.5 | 3100 | ND |
| 16 | 15 | 85 | 0.129 | 0 | 0 | — | 31 | 2.2 | 2900 | ND |
| 17 | 10 | 85 | 0.129 | 0 | 5 | — | 25 | 15 | 2500 | 6.2 |
| 18 | 10 | 87 | 0.132 | 0 | 3 | — | 23 | 12 | 2700 | 4.6 |
| 19 | 10 | 87 | 0.132 | 3 | 0 | — | 32 | 3.3 | 3200 | ND |
| 20 | 10 | 85 | 0.129 | 5 | 0 | — | 32 | 3.1 | 3050 | ND |
| 21 | 10 | 84 | 0.127 | 3 | 3 | — | 21 | 11 | 2900 | 4.8 |
| 22c | 10 | 90 | 0.136 | 0 | 0 | — | 26 | 1.5 | 3200 | ND |
| 23c | 10 | 87 | 0.132 | 0 | 3 | — | 20 | 8 | 2900 | 4.1 |
| 24 | 5 | — | — | — | — | 95 | 23 | 15 | 2600 | 6.8 |
| 25 | 10 | — | — | — | — | 90 | 22 | 14 | 2600 | 6.7 |
| 26 | 15 | — | — | — | — | 85 | 19 | 10.5 | 2500 | 5.9 |
| 27c | 10 | — | — | — | — | 90 | 20 | 9.5 | 2700 | 4.5 |
| 28 | 10 | — | — | — | — | 90 | 34 | 4.8 | 2790 | 1.3 |
| 29c | 10 | — | — | — | — | 90 | 35 | 5.2 | 2650 | 1.1 |

[1]NF Standard: T 51-034
[2]NR Standard: T 51-911
c: Comparative
ND Not determined

What is claimed is:

1. A process for preparing elastomer-coated mineral particles in the form of individual granules comprising:

(a) combining substantially spherical mineral particles with at least one binding agent containing at least one polyoxyethylenic sequence and with at least one elastomer latex to form an aqueous mixture containing said particles;

(b) stirring the reaction mixture until individual, elastomer-coated particles are formed;

(c) separating the liquid phase from the particles; and (d) drying said particles, wherein the elastomer provides functions including statistically derived distribution of groups of carboxylic acids and/or acid anhydrides.

$R_2$ represents a linear, branched or cyclic alkyl chain containing from 1 to 12 carbon atoms.

8. A process for preparing elastomer-coated mineral particles in the form of individual granules having an average diameter between 0.2 and 20 μm and a coating whose thickness is between 50 and 300 nm comprising:

a) combining substantially spherical mineral particles having an average diameter between 0.2 and 20 μm with at least one binding agent containing at least one polyoxyethylenic sequence and with at least one elastomer latex to form an aqueous mixture containing said particles;

b) stirring the reaction mixture until individual, elastomer-coated particles are formed;

c) separating the liquid phase from the particles; and d) drying the particles, wherein the elastomer provides functions including statistically derived distribution of groups of carboxylic acids and/or acid anhydrides.

9. The process of claim 8 wherein the mineral particles are selected from the group consisting of $SiO_2$, $CaCO_3$, $Ti_2O_3$, $Al(OH)_3$, and talc.

10. The process of claim 9 wherein the mineral particles have an electrically neutral or negatively charged surface.

11. The process of claim 8 wherein the binding agent is chosen from the group consisting of AB bisequenced or ABA or BAB trisequenced copolymers where A represents a polyoxyethylenic sequence and B represents a polyoxypropylene, polystyrene, methyl polymethacrylate, or vinylic and/or acrylic monomer-based sequence.

12. The process of claim 11 wherein the average molecular mass number of each polyoxyethylenic sequence is at least equal to 1000.

13. The process of claim 12 wherein the average molecular mass number of the binding agent is at least equal to 1500.

14. The process of claim 8 wherein the elastomer provides functions including statistically derived distribution of groups of carboxylic acids and/or acid anhydrides.

15. The process of claim 14 wherein the elastomer is chosen from among the dienic monomer based homopolymers and the copolymers based on dienic and styrenic or (meth)acrylic monomers of the formula

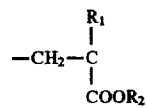

in which $R_1$ represents a hydrogen atom or a methyl group and $R_2$ represents a linear, branched, or cyclic alkyl chain containing from 1 to 12 carbon atoms.

* * * * *